Sept. 8, 1970  B. ECK  3,527,957

SOLID STATE REMOTELY CONTROLLED CIRCUIT USING CONTROL PULSES

Filed May 31, 1968

INVENTOR.
BERTIL ECK
BY Kinney, Alexander,
Sell, Steldt & De La Hunt
ATTORNEYS

United States Patent Office 3,527,957
Patented Sept. 8, 1970

3,527,957
SOLID STATE REMOTELY CONTROLLED
CIRCUIT USING CONTROL PULSES
Bertil Eck, St. Paul, Minn., assignor to Minnesota Mining and Manufacturing Company, St. Paul, Minn., a corporation of Delaware
Filed May 31, 1968, Ser. No. 733,697
Int. Cl. H03k 17/56
U.S. Cl. 307—140                    11 Claims

ABSTRACT OF THE DISCLOSURE

A solid state control device for remotely controlling energization of a load from a power source is shown wherein conduction of a bi-directional semiconductor device can be remotely controlled by an isolated low voltage remote control console which when remotely actuated by an operator actuates a pulse generating means which triggers the bi-directional semiconductor device to connect the load to the power source. In one embodiment, the circuit can be used for remotely controlling operation of a slide projector lamp and slide control mechanism.

---

Remote controlled devices such as, for example, slide projectors and the like are well known in the art. In such remote control devices, it is necessary and desirable that the remote console, which is in the hands of an operator, use low control voltages for switching purposes. Also, it is desirable that the remote console be isolated from the higher voltage circuits being controlled and from the load being controlled. Typically, known isolation circuits include use of step-down transformers in combination with relays having relay coils and contacts.

In known prior art devices for controlling operation of a slide projector lamp and slide control mechanism, a low voltage control console is provided which includes a switch for remotely controlling the energization and de-energization of the projector lamp and a switch or switches for remotely controlling direction, actuation and deactuation of a motor which drives the slide control mechanism. Conventionally, a drive motor is operatively connected to a slide control mechanism such that when the motor is actuated in a forward direction, a cartridge stepper mechanism advances a slide cartridge into position where a slide pickup mechanism moves a slide into the lens system for display. When it is desired to reverse operation of the slide control mechanism to redisplay a slide, a reversing solenoid is utilized to reverse the cartridge stepper mechanism. Thus, when the drive motor is actuated, the solenoid is concurrently actuated to reverse operation of the cartridge stepper mechanism to reverse or back track the slide cartridge. In this manner, the slide cartridge is back tracked such that the slide pickup device can reposition the previously shown slide in the lens system for display.

The prior art remote control of a slide projector which operates as described above is accomplished by means of a remote control console which is isolated from a 120 volt, 60 hertz (Hz.) alternating current source by means of a step-down transformer. Typically, the transformer is a 120 volt/24 volt, 60 Hz. filament step-down transformer and the 24 volt, 60 Hz. stepped down voltage is used as a control voltage.

In the prior art remote control devices, operation is accomplished by electrically connecting the 24 volt secondary winding of the step-down transformer across the coil of a 24 volt relay and normally-open, remotely controlled, manually operated switch. When the relay coil is energized from the 24 volt secondary winding of the transformer, a normally-open contact is moved to its closed position energizing the load to be controlled, such as for example either the lamp or drive motor or drive motor and solenoid. By use of a 24 volt control voltage, the remotely disposed console, which is in the hands of the operator, is substantially isolated from the 120 volt alternating current source and the voltage across the manually operated switches is well under the 30 volts requirement of the Underwriters Laboratories.

The prior art isolated relay remotely controlled devices have certain disadvantages. In particular, the control circuitry in such devices requires that a relay coil and contacts be used for controlling a load which is subject to high frequency switching. High frequency switching of relay contacts over a period of time results in relay contacts becoming pitted or otherwise contaminated such that over a prolonged period of time the relay could become inoperative. Additionally, the relay opening and closing produces undesirable noises and disturbances. When the cartridge stepper mechanism is advanced such that the slide pickup mechanism picks up and positions a slide in the lens system for display by the projector, the relay clicks on each slide advancement. This constant clicking noise is disturbing to the viewing audience. Also, since independent remote control of a lamp and slide advance is desired, it is required that a relay coil and its associated contact be provided for each control function.

The present invention overcomes the disadvantages of the prior art. The present invention disclosed herein resides in the use of an isolated solid state remote controlled circuit which utilizes control pulses for actuating solid state switching devices. In one embodiment of the present invention, a bi-directional triode thyristor is utilized and is connected in series with the load to be controlled. Isolation from the 120 volt alternating current source is obtained by use of a step-down filament transformer and a pulse generating means. The pulse generating means is connected across the secondary of the filament transformer and in series with switches located on the remotely disposed control console. When the manually operable switching means is actuated, the pulse generating means is responsive to the switching means to generate an electrical control pulse of a predetermined voltage which in turn is used to directly trigger the bi-directional triode thyristor. In addition, the pulse generating means is adapted to electrically isolate the switching means from the bi-directional triode thyristor.

This solid state remote control circuit has several advantages over the prior art. In particular, the solid state device eliminates a need for individual relay coil and contact assemblies for controlling switching of each load. Further, operation of the solid state bi-directional triggering device is quiet and does not provide disturbing clicking sounds each time a slide is advanced. Also, by use of the present invention, a relatively economical and safe isolated low voltage control console can be developed with very few moving parts.

Another advantage of the present invention is that a solid state switching circuit can be used for quietly controlling operation of a motor drive and projector lamp in a slide projector.

A further advantage of the present invention is that in response to the projector being energized, a slide from a slide cartridge can be automatically placed in display position in the lens system.

Yet another advantage of the present invention is that an override control circuit is capable of operating the motor drive to remove a slide from the lens system and replace the slide in a slide cartridge after the projector master switch is de-energized.

These and other advantages of the present invention will become apparent in light of the description of the embodiments set forth herein taken together with the drawing wherein.

Briefly, a circuit for controlling energization of a load, such as for example a lamp and/or motor of a projector, from a power source is shown. The circuit includes a bi-directional semiconductor device which is triggered by a control pulse. In the preferred embodiment, the bi-directional semiconductor device is a bi-directional triode thyristor. Thus, an electrical control pulse of predetermined voltage is applied to the gating lead, which triggers the bi-directional triode thyristor allowing current to pass therethrough. A means operatively connected across the power source and in parallel to the load is utilized for stepping down the voltage of the power source to a low control voltage. A pulse generating means is operatively connected across the stepping down voltage means and to the gating lead of the bi-directional triode thyristor. The pulse generating means is adapted to apply a triggering pulse of a predetermined voltage to the gating lead. A switching means is operatively connected in series with the pulse generating means for connecting the pulse generating means to the stepping means when the switching means is actuated thereby causing the pulse generating means to generate the triggering pulses. When the switching means is actuated causing the pulse generating means to apply triggering pulses to the gating lead, the bi-directional triode thyristor is triggered and energizes the load from the power source.

Figure 1:
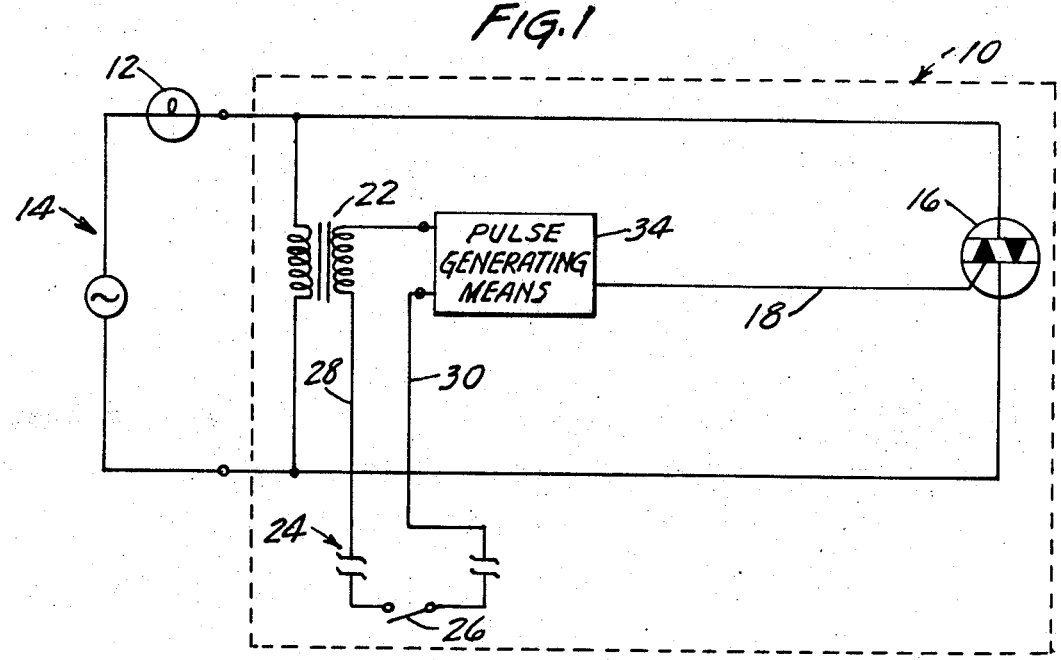
FIG. 1 is a schematic diagram partially in block form showing the present invention in its broadest concept.

FIG. 1 is a schematic diagram partially in block form illustrating the present invention. A circuit, generally designated as 10, is utilized for controlling energization of a load such as, for example, a lamp 12 from a power source, generally designated as 14. The circuit 10 includes a bi-directional semiconductor device, which in this embodiment is a bi-directional triode thyristor 16, having a gating lead 18. It is contemplated that other bi-directional semiconductor devices could be used in place of the bi-directional triode thyristor 16, such as for example silicon controlled rectifiers connected back-to-back and the like. Also, it is contemplated that with a light activated bi-directional triode thyristor used in place of bi-directional triode thyristor 16, a control lamp could be used as the pulse generating means 34 to control triggering of the light activated bi-directional triode thyristor. In such a case, the gating lead 18 would, of course, be unnecessary since the control pulse triggering the light activated bi-directional triode the thyristor is a light pulse.

The bi-directional triode thyristor 16 is operatively connected in series with the lamp 12 across the power source 14. The gating lead 18 is capable of triggering or rendering the bi-directional triode thyristor 16 conductive to allow a current to pass therethrough when a triggering pulse of predetermined voltage is applied to the gating lead 18.

The circuit 10 further includes means operatively connected across the power source 14 and in parallel to said series connected load or lamp 12 and the bi-directional triode thyristor 16 for stepping down the voltage of the power source to a low control voltage. One example of the stepping down voltage means is a transformer, generally designated as 22. The circuit 10 further includes a switching means 24 which includes a switch 26. Switch 26 is electrically connected to the secondary winding of the step-down transformer 22. The switching means 24 is adapted to be remotely disposed from the remainder of the circuit and electrically connected thereto by means of conductors 28 and 30.

A pulse generating means 34 is electrically connected across the secondary winding of transformer 22 and in series with the switch 26 of the switching means 24. The pulse generating means 34 is responsive to closure of switch 26 to produce and apply a triggering pulse of a predetermined voltage to the gating lead 18.

In summary, the circuit 10 via transformer 22 and switch 26 is capable of controlling a pulse generating means 34 such that closure of remotely located switch 26 connects the pulse generating means 34 across the transformer 22. The pulse generating means 34, in turn, produces a triggering pulse of a predetermined voltage which triggers the bi-directional triode thyristor 16 to energize the lamp 12 from the power source 14.

Figure 2:
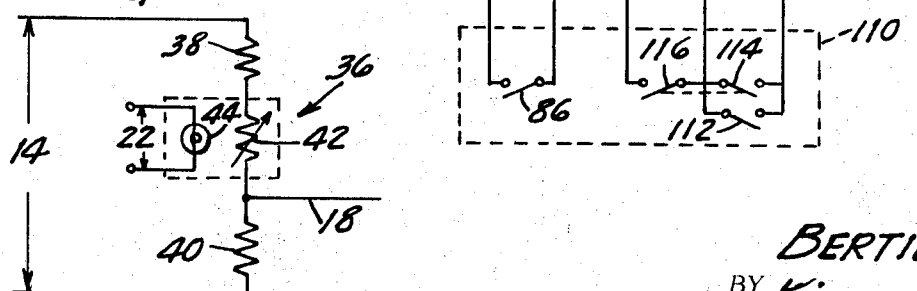
FIG. 2 is a schematic diagram showing one embodiment of the circuit of FIG. 1 wherein the pulse generating means for generating a pulse is a lamp-photocell module.

FIG. 2 illustrates one embodiment for the pulse generating means 34. A voltage dividing network, generally designated as 36, is connected across power source 14. The voltage dividing network 36 includes two fixed resistors 38 and 40 connected in series with a photocell 42. Photocell 42 is part of a lamp-photocell module which includes a lamp 44 which is electrically connected to step-down transformer 22. The gating lead 18 of bi-directional triode thyristor 16 is connected between resistor 40 and photocell 42. When the voltage across resistor 40 abruptly increases to a predetermined voltage, a triggering pulse of a predetermined voltage magnitude is applied to gating lead 18.

In operation, when switch 26 is momentarily closed, a low control voltage from the secondary winding of transformer 22 energizes lamp 44 which causes the resistance of photocell 42 to abruptly decrease. When the resistance of photocell 42 abruptly decreases, a triggering pulse of a predetermined voltage occurs across resistor 40. The so-generated triggering pulse is applied to gating lead 18 to trigger the bi-directional triode thyristor 16 as described herein. In the event a light responsive bi-directional semiconductor device is utilized, the lamp 44 can be positioned immediatley adjacent the device such that the control pulse, in the form of a light pulse produced by closure of switch 26, is directed upon and triggers the bi-directional semiconductor device.

Figure 3:
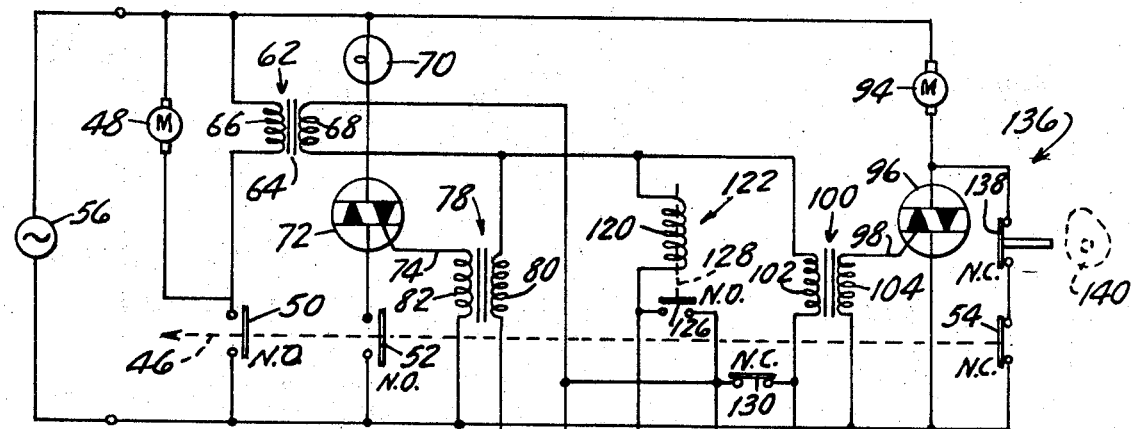
FIG. 3 is a schematic diagram of yet another embodiment of the present invention adapted for use in controlling operation of a slide projector lamp and motor drive.

FIG. 3 illustrates another embodiment utilizing the teachings of this invention. FIG. 3, in this embodiment, is adapted for use with a remote control console for controlling a slide projector. Generally, the slide projector includes a projector lamp and a drive motor which is to be actuated or controlled either remotely or by means of a cam-operated control. In FIG. 3, the circuitry includes a master switch, having an "on" and an "off" position, and which is generally designated as 46, which has two normally-open contacts, designated 50 and 52, and a normally-closed contact 54. The contacts 50–54 are illustrated with the master switch 46 in its "off" or deenergized position. Each of the switch contacts 50, 52 and 54 controls energizing various sections of the projector control circuitry from a 115 volt, 60 Hz. power source 56 and each of these sections will now be considered separately.

A power supply section 62 includes a step-down transformer 64 having a primary winding 66 and a secondary winding 68. Primary winding 66 is electrically connected in series with the normally-open contact 50 which together are electrically connected across the power source 56 such that when the normally-open contact 50 is closed, the primary winding 66 of transformer 64 is energized producing a low control voltage across secondary winding 68. In addition, closure of contact 50 also energizes a fan motor 48 which circulates air in the vicinity of the projector lamp to cool the lamp. The low control voltage generated across secondary winding 68 is used hereinafter to perform several functions. The output voltage generated by secondary winding 68 is thus selected to be at a level which is sufficient to enable an operator to remotely control operation of the projector.

A projector lamp 70 is electrically connected in series with a first bi-directional triode thyristor 72 having a gating lead 74. The series connected lamp 70 and bi-directional triode thyristor 72 are electrically connected in series with normally-open contact 52. The lamp 70, bi-directional triode thyristor 72 and normally-open contact 52 are electrically connected across the power source 56. When contact 52 is closed due to master switch 46 being moved to an "on" position, application of a triggering pulse to gating lead 74 will trigger bi-directional triode thyristor 72 energizing lamp 70.

Triggering pulses are applied to gating lead 74 by a second step-down transformer 78. Step-down transformer 78 has a primary winding 80 and a secondary winding 82. Primary winding 80 is electrically connected in series with a remote lamp switch 86. The series connected primary winding 80 and lamp switch 86 are electrically connected across the output of secondary winding 68 of transformer 64. Secondary winding 82 is electrically connected in series with the gating lead 74 so as to be in parallel with normally-open contact 52. Thus, when an operator closes the remotely located lamp switch 86, the voltage appearing across the secondary winding 68 of transformer 64 is applied to the primary winding 80 of transformer 78 which in turn generates or produces a triggering pulse of a predetermined voltage across the secondary winding 82. This triggering pulse of a predetermined voltage is applied across the gating lead 74 which triggers the bi-directional triode thyristor 72 to energize lamp 70 when normally-open contact 52 is in its closed position.

The motor for advancing and reversing each slide in the slide projector can also be remotely controlled. A motor, generally designated as 94, is mechanically connected to a slide control mechanism (not shown) which includes a cartridge stepping mechanism, which moves a slide tray forward and backward, and slide pickup mechanism (not shown) for positioning a slide so as to be illuminated by lamp 70. Since the slide projector and its associated lens system, slide cartridge stepping mechanisms and slide pickup mechanism are known in the art, a description thereof is not deemed necessary. The motor 94 is electrically connected in series with a second bi-directional triode thyristor 96 having a gating lead 98. A third step-down transformer 100 having a primary winding 102 and a secondary winding 104 is used to trigger the bi-directional triode thyristor 96. The primary winding 102 of transformer 100 is electrically connected in series with a remotely controlled switching network, generally designated as 110. Switching network 110 includes a forward switch 112 which, when actuated, electrically connects the primary winding 102 across the secondary winding 68 of transformer 64. When this occurs, a triggering pulse is produced across the secondary winding 104 of transformer 100 which triggers bi-directional triode thyristor 96 when contact 50 is in its closed position.

The switching network 110 also includes a pair of series connected reverse switches 114 and 116 which are ganged together such that closure of one of the switches, such as for example switch 114, concurrently closes the other of the switches, such as for example switch 116. Closure of reverse switch 114 performs the same function as closure of forward switch 112; namely, to connect the primary winding 102 across the secondary winding 68 of transformer 64 to trigger bi-directional triode thyristor 96. However, switch 116 is electrically connected in series with a coil 120 of a reversing solenoid 122. Solenoid 122 has a plunger or finger-like member represented by dashed line 128. When coil 120 is energized, the plunger 128 is directed into engagement with an advancing pawl of the cartridge stepper mechanism (not shown). Concurrently, plunger 128 engages a normally-open microswitch 126 which is connected in parallel to reverse switch 116. When microswitch 126 is closed, switch 126 then seals in or latches the solenoid 122 by connecting coil 120 across the secondary winding 68 of transformer 64. When the plunger 128 engages the advancing pawl of the cartridge stepping mechanism as described above, the cartridge stepper mechanism (not shown) back steps the slide cartridge in response to the drive motor 94 which rotates in the same direction as for forward advance of the cartridge stepping mechanism. The slide pickup mechanism (not shown) then removes the slide from the backed-up slide cartridge and positions the slide in the lens system (not shown) for display.

Termination of drive motor operation in both the forward direction and the reverse direction is provided by a slide pickup mechanism activated normally-closed contact 130. Slide activated contact 130 is connected in parallel to forward switch 112 and reverse switch 114. Also, contact 130 is connected between normally-open microswitch 126 of reversing solenoid 122 and the secondary winding 68 of transformer 64. When the slide pickup mechanism (not shown) is driven so as to position a slide in the lens system for display, the slide pickup mechanism urges normally-closed contact 130 into an open position.

Typically, a forward operation would be initiated by closure of forward switch 112 and terminated by opening of normally-closed contact 130. A reverse operation would be initiated by simultaneous closure of reverse switches 114 and 116 which causes coil 120 to be latched or sealed in by the normally-closed microswitch 126 until normally-closed contact 130 is opened by the slide pickup mechanism. Energization of the drive motor 94 by closure of switches 112 and 114 and normally-closed contact 130 will now be considered.

The secondary winding 104 of transformer 100 is electrically connected to the gating lead 98 of the second bi-directional triod thyristor 96 such that when a voltage is impressed across the primary winding 102, a triggering pulse of a predetermined voltage is applied to the gating lead 98. When a predetermined voltage is applied to the gating lead 98, the bi-directional triode thyristor 96 is triggered energizing motor 94.

One feature of the remote control circuit is that when a sliding cartridge is in position in the projector and when master switch 46 is moved to its "on" position, the slide pickup mechanism (not shown) will immediately pickup a slide from the slide cartridge and position the slide in display position in the lens system (not shown). In this instance, the normally-closed contact 130 is closed and controls actuation of the drive motor 94 until the contact 130 is moved to an open position by the slide pickup mechanism.

An override circuit, generally designated as 136, enables the motor 94 to be controlled after the master switch 46 is switched to an "off" position. If a slide is in display position in the projector when the master switch 46 is turned to the "off" position, normally-closed contact 54 and a cam-activated normally-closed contact 138 energizes the drive motor 94 until the slide is repositioned in the proper location in the slide cartridge. This permits removal of the slide cartridge from the projector with all the slides in position and without any slides being left in the display position of the projector. When the slide cartridge has reached this position, a cam 140 contacts and urges the normally-closed contact 138 into an open-circuit position thereby de-energizing motor 94. This insures that the projector, when shut off, will have all the slides relocated in the slide cartridge such that the slide cartridge can be removed from the projector.

In the circuit of FIG. 3, the first transformer 64 may be a Triad 120/24 volt filament transformer type F45X, transformer 78 and 100 may be a 24/6 volt trigger transformer and the bi-directional triode thyristors 72 and 96 may be an ECC Quadrac #2005 or equivalent, no triggering diodes being required.

It is readily apparent that the circuit disclosed herein has other applications and that the embodiments disclosed herein can be modified, improved and the like and all are deemed within the scope of the appended claims.

What is claimed is:

1. A circuit for remotely controlling energization of a load from a power source comprising
    a bi-directional semiconductor device adapted to be operatively connected in series with a said load and a said power source, the bi-directional semiconductor device being capable of being triggered to allow current to pass therethrough to energize a said load from a said power source;
    means operatively connected across a said power source and in parallel to the bi-directional semiconductor device which means are adapted for electrically isolating the bi-directional semiconductor device from said power source and adapted for stepping down the voltage of said power source to a low control voltage;
    pulse generating means operatively connected across the stepping down voltage means and operatively connected to the bi-directional semiconductor device, which pulse generating means is adapted for providing a triggering pulse of a predetermined voltage for triggering the bi-directional semiconductor device and adapted for electrically isolating the bi-directional semiconductor device from the stepping down voltage means; and
    switching means operatively connected in series with the pulse generating means and adapted for connecting the pulse generating means to the stepping down means when the switching means is actuated, to cause the pulse generating means to trigger the bi-directional semiconductor device.

2. The circuit of claim 1 wherein the bi-directional semiconductor device is a bi-directional triode thyristor having a gating lead, the stepping down voltage means is a transformer and the pulse generating means generates an electrical control pulse of a predetermined voltage which is applied to the gating lead for triggering the thyristor.

3. The circuit of claim 2 wherein the pulse generating means includes a triggering transformer.

4. The circuit of claim 2 wherein the circuit further comprises
    a voltage dividing network adapted to be electrically connected across a said power source and which is electrically connected to the gating lead; and
    a lamp-photocell module having the photocell electrically connected in series with the voltage dividing network and the lamp electrically connected in series with the switching means, the lamp upon actuation of the switching means being adapted to be connected across and energized by the transformer for producing light radiation which is directed upon the photocell to reduce its resistance which in turn changes the voltage applied ot the gating lead by the voltage dividing network to a said predetermined voltage to trigger the thyristor.

5. A pulse controlled circuit comprising
    a pair of input terminals;
    a bi-directional semiconductor device connected across the input terminals;
    a pulse generating means operatively connected to the bi-directional semiconductor device for selectively producing a control pulse of a predetermined voltage to trigger the bi-directional semiconductor device;
    a step-down transformer having a primary winding and a secondary winding, the primary winding being connected across the input terminals and the secondary winding being electrically connected to the pulse generating means; and
    a switching means electrically connected in series with the pulse generating means and operatively connected to the transformer secondary winding for connecting the pulse generating means to the transformer secondary winding to selectively produce said control pulses for triggering the bi-directional semi-conductor device;
    which pulse generating means is adapted to electrically isolate the switching means from the bi-directional semiconductor device.

6. The circuit of claim 5 wherein the bi-directional semiconductor device is a bi-directional triode thyristor and the pulse generating means is a triggering transformer.

7. A circuit for remotely controlling operation of a lamp and motor driven slide control mechanism in a slide projector which is adapted to be energized from an alternating current source comprising
    a pair of input terminals adapted to be electrically connected to said power source;
    a first step-down transformer operatively connected across said input terminals for producing a low control voltage;
    a lamp control circuit comprising
        a first bi-directional triode thyristor having a gating lead and which is electrically connected in series with said lamp, said series connected first thyristor and lamp being connected across said input terminals,
        a second transformer having its primary electrically connected across the first transformer secondary and its secondary electrically connected between said gating lead of said first thyristor and one of said two input terminals, and
        a lamp control switching means electrically connected in series with said second transformer primary for connecting said second transformer primary across said first transformer secondary to generate a first triggering pulse across said second transformer secondary when said lamp switching means is actuated, said first triggering pulse being applied to said gating lead of said first thyristor for triggering said first thyristor to energize said lamp from said power source; and
    a motor control circuit comprising
        a second bi-directional triode thyristor having a gating lead and which is electrically connected in series with said motor, said series connected second thyristor and said motor being electrically connected across said input terminals,
        a third transformer having its primary electrically connected across the secondary of said first transformer and its secondary electrically connected between said gating lead of said thyristor and one of said input terminals,
        a solenoid having a coil and a plunger, said coil being operatively connected to said first transformer secondary and said plunger being adapted to be moved when said coil is energized to reverse said slide control mechanism,
        a control switching means operatively connected between said coil and said first transformer secondary and positioned to be actuated by said plunger when said coil is energized for latching said solenoid,
        a motor control switching matrix having a first switching means electrically connected in series with said third transformer primary for connecting said third transformer primary across said first transformer secondary to generate a second triggering pulse across said third transformer secondary when said switching means is actuated, said second triggering pulse being applied to said gating lead of said second thyristor for triggering said second thyristor to energize said motor from said power source to drive said slide control mechanism in a forward direction, said switching matrix having a second and third switching means which are electrically connected in parallel across said first switching means and said control switching means respectively for concurrently energizing said coil and said motor from said power source to drive said slide control mechanism in a reverse direction, and a terminating switching means electrically connected in parallel to said first switching means and said second switching means and in series with said control switching means for de-energizing said motor and said coil when said slide control mechanism is operated to position a slide into said projector for display.

8. The circuit of claim 7 further comprising an override circuit having a normally-closed cam-actuated contact which is capable of connecting said motor directly to said power source when said projector is shut off for removing a slide from said projector and replacing said removed slide in a slide cartridge, said normally-closed contact being adapted to be moved to an open position by a cam in response to said slide control mechanism completing said slide removal and replacement.

9. The circuit of claim 8 further comprising a master switch having a first normally open contact which is connected in series with said first step down transformer and a second normally-closed contact which is connected in series with said cam-actuated contact, said master switch having an "off" position wherein said first contact is open and said second contact is closed and an "on" position wherein said first contact is closed and said second contact is open.

10. The circuit of claim 9 wherein said projector includes a motor for driving a fan which is connected in series with said first contact such that said fan motor is adapted to be energized from said power source by said first contact when said master switch is in said "on" position.

11. A circuit for remotely controlling operation of a motor driven slide control mechanism in a slide projector which is adapted to be energized from an alternating current source comprising a pair of input terminals adapted to be electrically connected to said power source;

a first step-down transformer operatively connected across said input terminals for producing a low control voltage;

a motor control circuit comprising a bi-directional triode thyristor having a gating lead and which is electrically connected in series with said slide control motor, said series connected thyristor and said motor being electrically connected across said input terminals, a second transformer having its primary electrically connected across the secondary of said first transformer and its secondary electrically connected between said gating lead of said thyristor and one of said input terminals, a solenoid having a coil and a plunger, said coil being operatively connected to said first transformer secondary and said plunger being adapted to be moved when said coil is energized to reverse said slide control mechanism, a control switching means operatively connected between said coil and said first transformer secondary and positioned to be actuated by said plunger when said coil is energized for latching said solenoid, a motor control switching matrix having a first switching means electrically connected in series with said second transformer primary for connecting said second transformer primary across said first transformer secondary to generate a triggering pulse across said second transformer secondary when said switching means is actuated, said triggering pulse being applied to said gating lead of said thyristor for triggering said thyristor to energize said motor from said power source to drive said slide control mechanism in a forward direction, said switching matrix having a second and third switching means which are electrically connected in parallel across said first switching means and said control switching means respectively for concurrently energizing said coil and said motor from said power source to drive said slide control mechanism in a reverse direction, and a terminating switching means electrically connected in parallel to said first switching means and said second switching means and in series with said control switching means for de-energizing said motor and said coil when said slide control mechanism is operated to position a slide into said projector for display.

References Cited

UNITED STATES PATENTS

| 2,324,844 | 7/1943 | Hutt | 307—114 X |
| 3,418,489 | 12/1968 | Platzer | 307—252 X |
| 3,439,183 | 4/1969 | Hurst | 307—252 X |

OTHER REFERENCES

"Economy Power Semiconductor Applications," by F. W. Gutzwiller, aand E. K. Howell, Seminar Application Information, G. E. 671.1, p. 9, March 1965.

ROBERT K. SCHAEFER, Primary Examiner

T. B. JOIKE, Assistant Examiner

U.S. Cl. X.R.

307—252